United States Patent [19]
Capen et al.

[11] Patent Number: 5,410,363
[45] Date of Patent: Apr. 25, 1995

[54] AUTOMATIC GAIN CONTROL DEVICE FOR TRANSMITTING VIDEO SIGNALS BETWEEN TWO LOCATIONS BY USE OF A KNOWN REFERENCE PULSE DURING VERTICAL BLANKING PERIOD SO AS TO CONTROL THE GAIN OF THE VIDEO SIGNALS AT THE SECOND LOCATION

[75] Inventors: Ross D. Capen; Kevin F. Keefe, both of Milford, Conn.

[73] Assignee: Lightwave Communications, Inc., Milford, Conn.

[21] Appl. No.: 986,925

[22] Filed: Dec. 8, 1992

[51] Int. Cl.⁶ .................................. H04N 7/18
[52] U.S. Cl. ..................... 348/679; 348/684; 348/678
[58] Field of Search ............ 273/DIG. 28; 358/160, 358/21 R, 17, 176-179, 86, 17, 27, 35, 38, 40, 904, 903, 901, 148, 150, 149; 330/279, 52, 137; 340/717, 825.06; 455/1, 3.1, 4.1, 3.3, 4.2, 5.1; 434/307, 118, 350, 323, 336; 359/161, 158, 173; 348/678, 679, 684; H04N 7/18, 7/173, 7/22, 7/10, 7/093, 7/14, 5/20, 5/205, 9/08, 7/00

[56] References Cited

U.S. PATENT DOCUMENTS

| | | | |
|---|---|---|---|
| 2,303,968 | 5/1939 | White | 348/528 |
| 3,578,898 | 5/1971 | Kuzminsky et al. | |
| 4,275,420 | 6/1981 | Yamada et al. | |
| 4,321,618 | 3/1982 | Hirose et al. | |
| 4,709,258 | 11/1987 | Sazler | 358/27 |
| 4,718,119 | 1/1988 | Sazler et al. | 358/178 X |
| 4,731,838 | 3/1988 | Amemiya et al. | |
| 4,742,575 | 5/1988 | Arita et al. | 358/174 X |
| 4,819,098 | 4/1989 | Ryan | |
| 5,132,827 | 7/1992 | Smith et al. | 358/172 X |
| 5,132,828 | 7/1992 | Conner et al. | 358/176 X |
| 5,146,332 | 9/1992 | Hara et al. | 358/172 |
| 5,194,822 | 3/1993 | Bureau et al. | 358/176 X |

FOREIGN PATENT DOCUMENTS

| | | | |
|---|---|---|---|
| 2511568 | 2/1983 | France | 359/158 |
| 0048413 | 4/1979 | Japan | 359/158 |
| 0120268 | 9/1980 | Japan | 358/148 |
| 0076946 | 5/1982 | Japan | 358/174 |
| 0111495 | 7/1983 | Japan | 358/174 |
| 0055647 | 3/1984 | Japan | 359/158 |
| 0160386 | 9/1984 | Japan | 358/27 |
| 0274533 | 12/1986 | Japan | 359/158 |
| 0187778 | 8/1988 | Japan | H04N 5/530 |
| 0165784 | 6/1990 | Japan | H04N 5/520 |
| 0208489 | 9/1991 | Japan | H04N 7/220 |
| 0285482 | 12/1991 | Japan | H04N 7/00 |
| 0293885 | 12/1991 | Japan | 358/176 |
| 0081091 | 3/1992 | Japan | H04N 7/18 |
| 0011887 | 8/1991 | WIPO | H04N 9/680 |

*Primary Examiner*—James J. Groody
*Assistant Examiner*—David E. Harvey
*Attorney, Agent, or Firm*—Ware, Fressola, Van Der Sluys & Adolphson

[57] ABSTRACT

An automatic gain control circuit 16 that can be used in a video transmission system 10 includes transmitter circuitry 18, receiver circuitry 20, and a fiber optic link 22 connected therebetween. The transmitter circuitry 18 injects an automatic gain control pulse having a known amplitude level into an electrical video signal. The transmitter circuitry 18 then converts the electrical video signal into an optical video signal, and transmits the optical video signal over the fiber optic link 22 to the receiver circuitry 20. The receiver circuitry 20 converts the optical video signal back into an electrical video signal and compares the amplitude level of the automatic gain control pulse in the electrical video signal to a reference having an amplitude level equal to the known amplitude level. The receiver circuitry 20 then adjusts the gain of the electrical video signal according to the amplitude level comparison so as to compensate for any amplitude level variations in the electrical video signal between the transmitter circuitry 18 and the receiver circuitry 20.

31 Claims, 7 Drawing Sheets

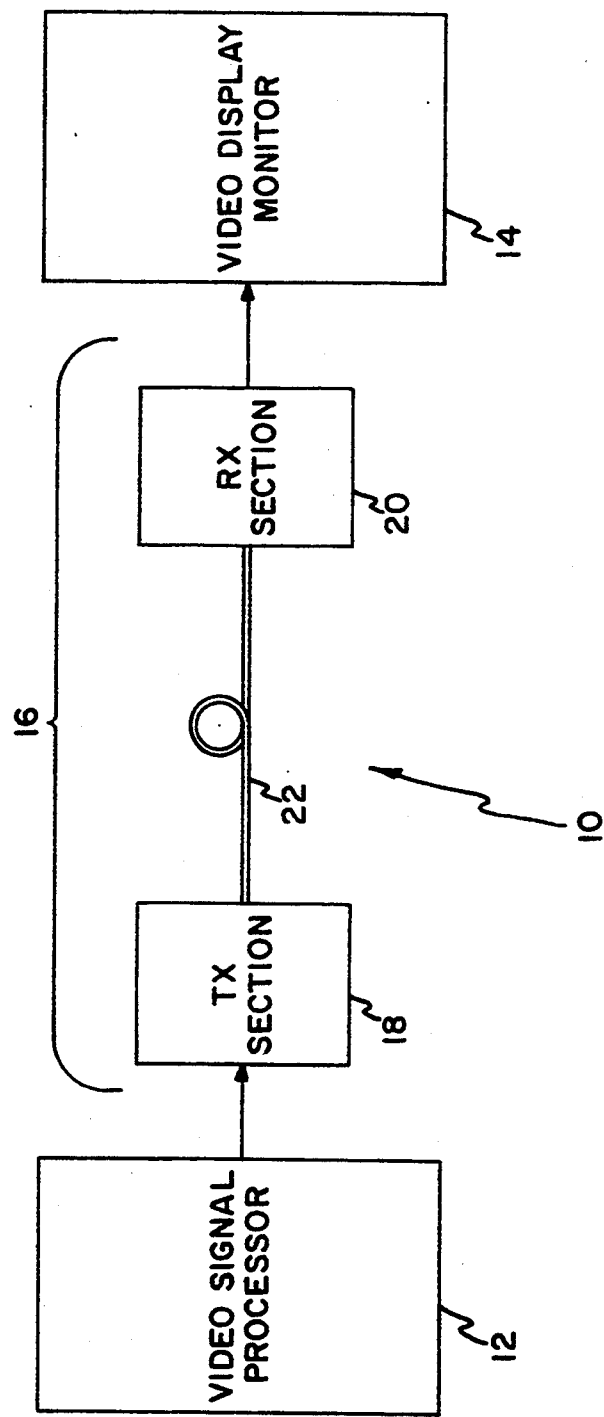

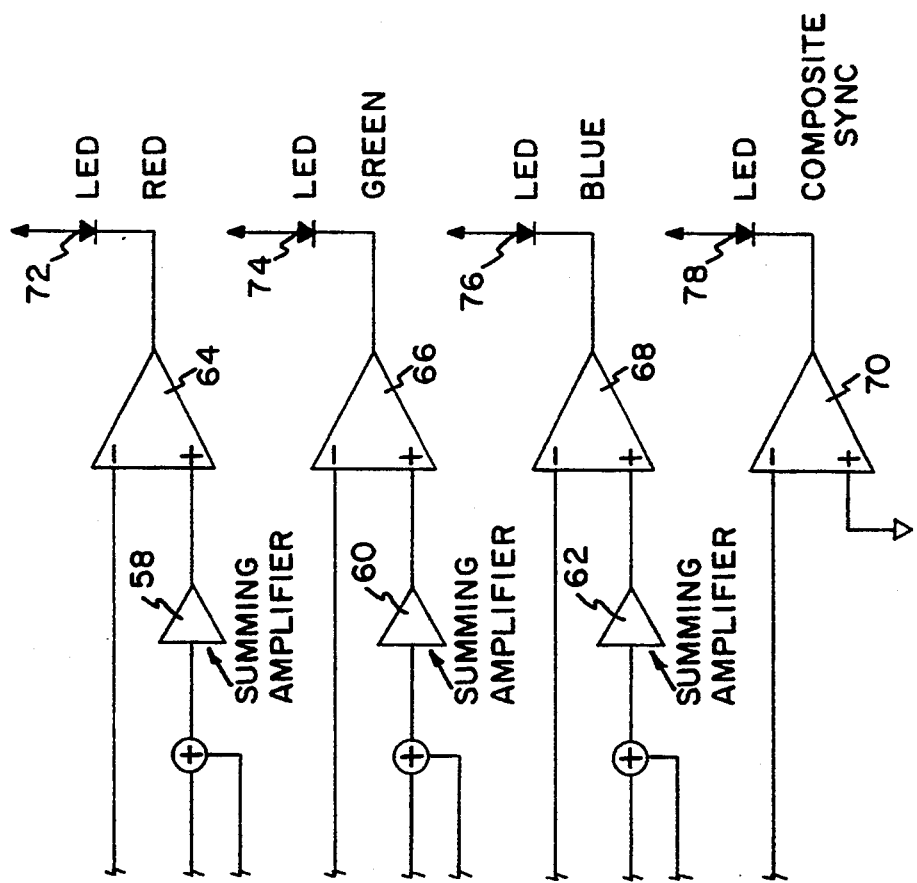

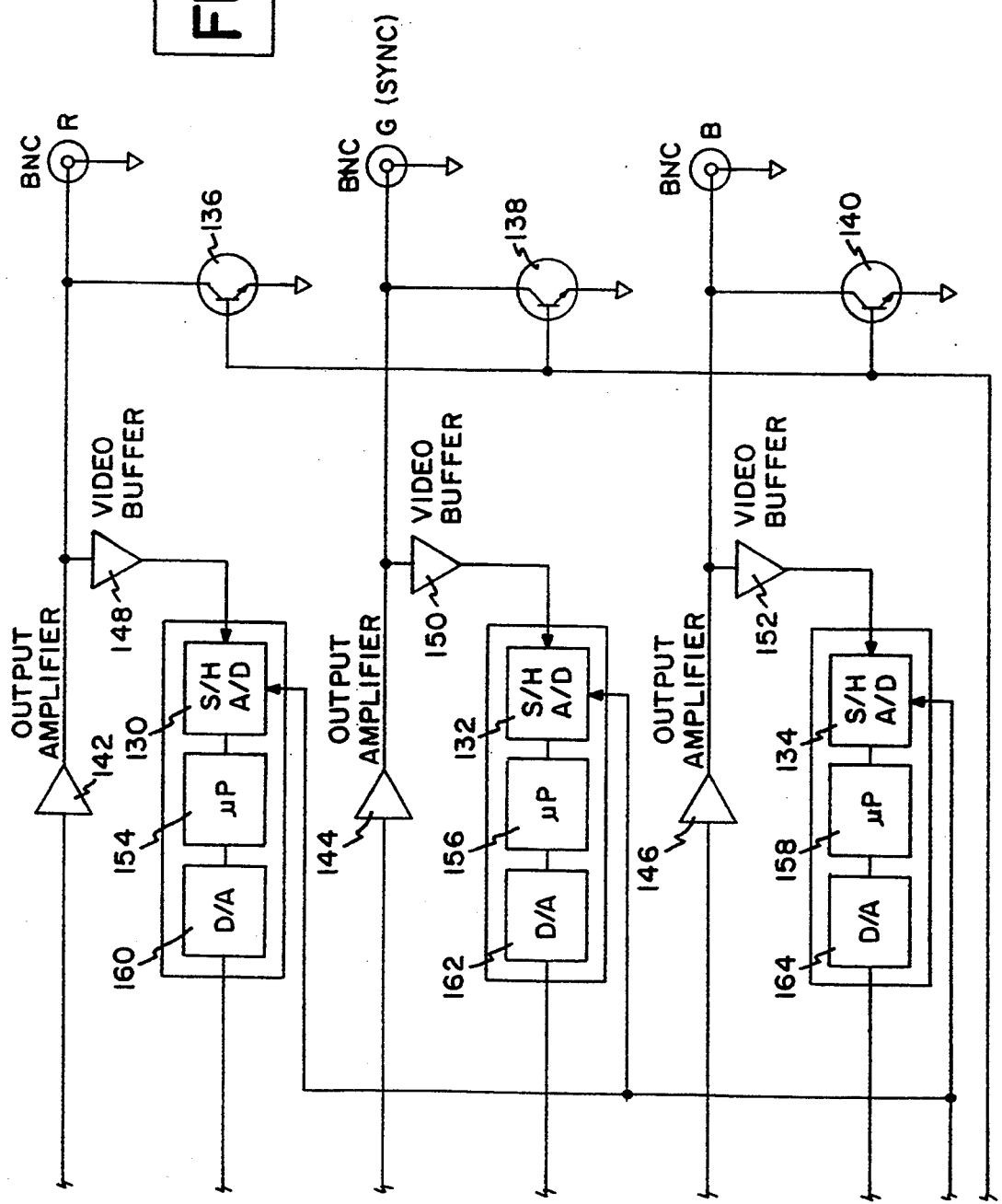

AUTOMATIC GAIN CONTROL DEVICE FOR TRANSMITTING VIDEO SIGNALS BETWEEN TWO LOCATIONS BY USE OF A KNOWN REFERENCE PULSE DURING VERTICAL BLANKING PERIOD SO AS TO CONTROL THE GAIN OF THE VIDEO SIGNALS AT THE SECOND LOCATION

BACKGROUND OF THE INVENTION

Field of the Invention

The present invention relates to video transmission systems and, more particularly, to an automatic gain control circuit that may be used to greatly extend the distance between a high performance video signal processor and a high resolution video display monitor, without sacrificing the quality of high resolution video signals that are transmitted therebetween.

Description of the Prior Art

The use of high resolution video display monitors for displaying graphics and other computer aided design applications is largely becoming the norm in the presently expanding computer workstation industry. These high resolution monitors operate by receiving high resolution video signals from high performance video signal processors. To date, the connection between a video display monitor and a video signal processor has been most commonly made by copper coaxial cables.

In many situations it is often required that a video display monitor be separated from its associated video signal processor by a considerable distance. Such a situation may occur when, for reasons of temperature, radiated emissions or suspected emissions, or any number of other environmental or practical considerations, a video signal processor may not be allowed in the same immediate area as its associated video display monitor. In any of these situations, it has been found that the maximum distance in which a high resolution video signal may be transmitted over a coaxial cable is on the order of 75 feet. Above this distance problems such as high signal attenuation, poor signal risetime, EMI and RFI susceptibility, and ground loops occur. To overcome these problems, the present invention provides a fiber optic video transmission system that incorporates an automatic gain control circuit to compensate for any losses between the video signal processor and the video display monitor.

It should be noted that the concept of using an automatic gain control circuit in a video system is relatively well known in the art. It should be also noted, however, that there are several different types automatic gain control circuits, as well as several different types of video systems. For example, U.S. Pat. Nos. 3,578,898, 4,275,420, and 4,819,098 each disclose different techniques for employing an automatic gain control circuit in a video system. A brief description of these prior art techniques is now given.

Kusminsky, et at, U.S. Pat. No. 3,578,898, discloses an automatic gain control circuit for use in a wide-band multi-channel color television system, such as a community antenna television system. Specifically, a pilot cattier signal is modulated so that gain control is effective during the retrace time of the channel 5 signal, thereby preventing visibility of any interference produced by the pilot carrier signal on an associated television receiver.

Yamada, et at, U.S. Pat. No. 4,275,420, discloses a television receiver with a ghost level detector in which a switching device is provided for switching on an automatic gain control circuit during at least a certain period of the vertical blanking period, such that a detected ghost level is not substantially influenced by a transient level change in the automatic gain control circuit. The automatic gain control circuit is used during the vertical blanking period so as to minimize any interaction with a ghost canceler circuit.

Ryan, U.S. Pat. No. 4,819,098, discloses circuitry that adds a positive pulse immediately following each normally occurring sync pulse during the vertical blanking period of a video signal. A videotape recording system generally uses an automatic gain control circuit for maintaining a constant video signal level by measuring the level of the normally occurring sync pulses during the vertical blanking period of a video signal. Thus, the positive pulses are added to prevent a videotape recording system from maintaining a constant video signal level, thereby resulting in generally unacceptable pictures.

Although all of the above-mentioned prior art techniques employ automatic gain control circuitry in one respect or another, none disclose a concept wherein an automatic gain control pulse having a known value is superimposed on each video signal in a high resolution video transmission system, whereby these pulses are later compared to a reference having a known value for adjusting the gain of each video signal, all in association with a fiber optic link between a video signal processor and a remote high resolution video display monitor. Such a concept is desirable since it allows a video signal processor and a video display monitor to be separated by relatively large distances. It is therefore desirable to overcome the shortcomings of the prior art in this area, while providing an automatic gain control circuit that may be used to greatly extend the distance between a high performance video signal processor and a high resolution video display monitor, without sacrificing the quality of high resolution video signals that are transmitted therebetween.

SUMMARY OF THE INVENTION

The present invention contemplates an automatic gain control circuit that may be used to greatly extend the distance between a high performance video signal processor and a high resolution video display monitor, while preserving the quality of high resolution video signals that are transmitted therebetween. The automatic gain control circuit is comprised of transmitter circuitry and receiver circuitry, with a fiber optic link connected therebetween. It should be noted that the fiber optic link may be comprised of as many optical fibers as are required.

The transmitter circuitry detects the vertical sync associated with each video signal generated by the video signal processor. Following the occurrence of the vertical sync period and a predetermined number of horizontal sync periods, an automatic gain control pulse is injected into each video signal. The automatic gain control pulse is injected during the period of time of the horizontal scan time that a video component would normally be present if this horizontal scan time occurred after the vertical blanking time. Each video signal is then sent to the receiver circuitry over the fiber optic link.

The receiver circuitry also detects the vertical blanking period associated with the video signal. After vertical sync detection and after the same predetermined number of horizontal sync pulses, the amplitude of the reference pulse is determined by an analog to digital converter. The actual amplitude of the reference pulse (as measured by the receiver), is then compared to the pre-defined (convert) value for the reference pulse. Depending upon the outcome of the comparison, gain may be added to or subtracted from each received video signal, using a digital to analog converter (DAC) to generate an error voltage that varies the gain of the gain control amplifier such that each resulting video signal will have a value equal to the value that each video signal had prior to being transmitted.

Once the gain of each video signal has been adjusted, each video signal may be sent to the video display monitor for viewing. It should be noted that the receiver circuitry provides further circuitry to prevent the automatic gain control pulse from being displayed by the monitor during the vertical blanking period.

From the above descriptive summary it is thus apparent how the present invention automatic gain control circuit overcomes the shortcomings of the prior art in this area.

Accordingly, the primary objective of the present invention is to provide an automatic gain control circuit that may be used to greatly extend the distance between a high performance video signal processor and a high resolution video display monitor, while preserving the quality of high resolution video signals that are transmitted therebetween.

Other objectives and advantages of the present invention will become apparent to those skilled in the art upon reading the following detailed description and claims, in conjunction with the accompanying drawings which are appended hereto.

DESCRIPTION OF THE DRAWINGS

In order to facilitate a fuller understanding of the present invention, reference is now made to the appended drawings. These drawings should not be construed as limiting the present invention, but are intended to be exemplary only.

FIG. 1 is a schematic diagram of a video transmission system incorporating an automatic gain control circuit according to the present invention.

PREFERRED EMBODIMENTS OF THE PRESENT INVENTION

Figure 2A:
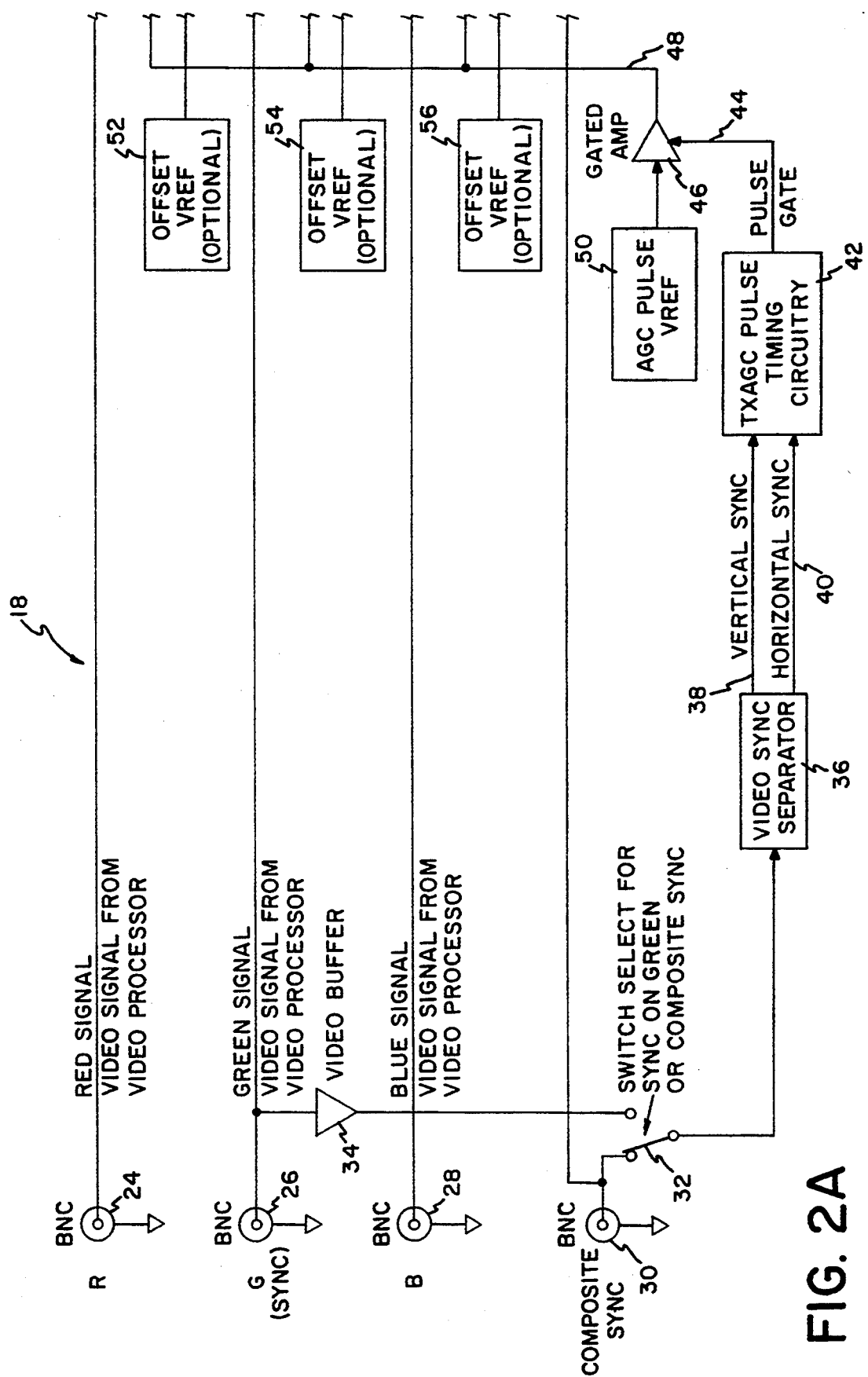
FIG. 2 consisting of FIGS. 2A and 2B, is a schematic diagram of the transmitter circuitry of the automatic gain control circuit of FIG. 1.

Referring to FIG. 1, there is shown a video transmission system 10 having a high performance video signal processor 12, a high resolution video display monitor 14, and an automatic gain control (AGC) circuit 16 according to the present invention. The AGC circuit 16 comprises transmitter circuitry 18 and receiver circuitry 20, with a fiber optic link 22 connected therebetween.

In general terms, the video transmission system 10 is controlled by the video signal processor 12 which generates standard video format electrical signals, including at least one high resolution video signal and a corresponding synchronization signal. These electrical signals are passed from the video signal processor 12 to the transmitter circuitry 18 of the AGC circuit 16. The transmitter circuitry detects the vertical sync associated with the video signal generated by the video signal processor. After vertical sync detection and after a predetermined number of horizontal sync pulses the circuit injects an automatic gain control pulse (reference pulse) onto each video signal. The automatic gain control pulse (reference pulse) is injected during the period of time of the horizontal scan time that a video component would normally be inserted if this horizontal scan time occurred after the vertical blanking period. All of the electrical signals are then converted into optical signals and transmitted to the receiver circuitry 20 of the AGC circuit 16 over the fiber optic link 22.

The receiver circuitry 20 of the AGC circuit 16 converts the received optical signals back into electrical signals. The receiver circuitry also detects the vertical sync signal associated with the video signal. After vertical sync detection and after the same predetermined number of horizontal sync pulses, the amplitude of the reference pulse is determined by an analog to digital converter. A comparison is then made between the actual amplitude of the reference pulse from the A to D converter, and the stored value that the reference pulse should be. Depending upon the outcome of the comparison, gain may be added to or subtracted from each received video signal using a digital to analog converter (DAC) to create an error voltage that varies the gain of the AGC amplifier such that each resulting video signal will have a value equal to the value that each video signal had prior to being transmitted. All of the electrical signals are then passed from the receiver circuitry 20 of the AGC circuit 16 to the video display monitor 14 for viewing.

It should be noted that an AGC circuit according to the present invention may support either RGB or monochrome video formats, with an AGC circuit supporting an RGB video format being slightly more complex. Accordingly, the AGC circuit 16 described herein supports an RGB video format, while an AGC circuit for supporting a monochrome video format may be directly derived herefrom by anyone having ordinary skill in the art.

Referring to FIG. 2, there is shown a schematic diagram of the transmitter circuitry 18 of the AGC circuit 16. In this section input BNC connections are provided from the video signal processor 12 to red 24, green 26, and blue 28 video signal lines, and to a composite synchronization signal line 30. It should be noted that in some RGB video formats synchronization information is carried on the green video signal line 26 (sync on green) instead of on the separate composite synchronization signal line 30. Thus, a switch 32 is provided for selecting between the green video signal line 26 or the composite synchronization signal line 30, thereby accommodating each different RGB video format. A video buffer 34 is also provided for isolating the green video signal line 26.

The transmitter circuitry 18 further provides video sync separator circuitry 36 for separating the synchronization signal into a vertical sync line 38 and a horizontal sync line 40. The vertical and horizontal synchronization signals are used by transmitter AGC pulse timing circuitry 42 to generate a pulse gate signal on a pulse gate line 44 for a gated amplifier 46. The pulse gate signal is generated in the form of a single pulse during every vertical blanking period, following the occurrence of the vertical sync period and a predetermined number of horizontal sync periods. The gated amplifier 46 responds to the pulse gate signal by generating an AGC pulse signal on an AGC pulse line 48 having an amplitude determined by an AGC pulse voltage reference 50. This AGC pulse line 48 is applied to the summing amplifier(s) 58, 60, 62, for each of the video signals 24, 26, 28 respectively. If necessary, an offset voltage generated by an offset voltage reference 52,54,56 is added to the AGC pulse signal with a corresponding summing amplifier 58,60,62, respectively. Furthermore, the AGC pulse signal, along with any offset voltage, is injected into the video signal on each video signal line 24,26,28 and amplitude modulated by operational amplifiers 64,66,68, respectively. The synchronization information on the composite synchronization signal line 30 is similarly amplitude modulated by operational amplifier 70. The resulting amplitude modulated signals excite LED's 72,74,76,78, respectively, which convert the electrical signals into optical signals for transmission over the fiber optic link 22. It should be noted that the LED's 72,74,76,78 typically operate at a 880 nm wavelength.

Referring to FIG. 3, there is shown a schematic diagram of the receiver circuitry 20 of the AGC circuit 16. In this section 20 the optical signals transmitted over the fiber optic link 22 from the transmitter circuitry 18 red 80, green 82, blue 84 and composite synchronization signal line 86, are correspondingly converted back into electrical signals by PIN diodes 88,90,92,94, respectively. Each video signal and the composite synchronization signal is passed through a detector preamplifier 96,98,100,102, respectively, and the composite synchronization signal is further passed through an output amplifier 104 which makes an output BNC connection to the video display monitor 14 (see FIG. 1).

Similar to the transmitter circuitry 18, the receiver circuitry 20 also provides a video buffer 106 to isolate the green video signal line 82, a switch 108 for selecting between the green video signal line 82 or the composite synchronization signal line 86, and video sync separator circuitry 110 for separating a vertical synchronization signal onto a vertical sync line 112 and a horizontal synchronization signal onto a horizontal sync line 114. The vertical and horizontal synchronization signals are used by receiver AGC pulse timing circuitry 116 to generate a clamp signal on a clamp line 118 for video amplifier black level clamp gain control circuitry 124,126,128, a start convert signal on a start convert line 120 for analog-to-digital conversion circuitry 130,132,134, and a strip pulse signal on a strip pulse line 122 for output transistor circuitry 136,138,140. The clamp signal is generated in the form of a single pulse during the horizontal sync period after every horizontal line scan. The video amplifier black level clamp gain control circuitry 124,126,128 responds to the clamp pulse signal by restoring each video signal line 80,82,84 to the amplitude of the corresponding offset voltage reference 52,54,56 in the transmitter circuitry 18, respectively, or to an amplitude common to each video signal, such as black level. It should be noted that the video amplifier black level clamp gain control circuitry 124,126,128 also allows the gain of each video signal to be adjusted, as will now be discussed.

The start convert signal is generated in the form of a single pulse during every vertical blanking period following the occurrence of the vertical sync period and the same number of horizontal sync periods that were used for the generation of the pulse gate signal in the transmitter circuitry 18. Thus, the start convert signal is active at the same time the AGC pulse signal is being carried on each video signal line 80,82,84. The analog-to-digital conversion circuitry 130,132,134 responds to the start convert signal by sampling the AGC pulse signal on each video signal line 80,82,84 after being passed through an output amplifier 142,144,146 and a video isolation buffer 148,150,152, respectively. The analog-to-digital conversion circuitry 130,132,134 then performs an analog-to-digital conversion on the sampled AGC pulse signals such that embedded processor circuitry 154,156,158 can perform a comparison between the amplitude value of each sampled AGC pulse signal and a stored reference having a value equal to the amplitude value of the AGC pulse voltage reference 50, which was the amplitude value that AGC pulse signal had when it was originally injected into each video signal line 24,26,28 in the transmitter circuitry 18, respectively. Depending upon the outcome of each comparison, the embedded processor circuitry 154,156,158 may adjust the gain of each video signal by adjusting a gain control voltage applied to the video amplifier black level clamp gain control circuitry 124,126,128 by way of digital-to-analog conversion circuitry 160,162,164, respectively. This gain adjustment process results in each video signal having an amplitude value equal to the amplitude value that each video signal had prior to being transmitted from the transmitter circuitry 18. It should be noted that the analog-to-digital conversion circuitry 130,132,134, the embedded processor circuitry 154,156,158, and the digital-to-analog conversion circuitry 160,162,164 may all be contained in a single embedded microcontroller device, such as an Intel 8751 microcontroller device.

Similar to the start convert signal, the strip pulse signal is also generated in the form of a single pulse during every vertical blanking period following the occurrence of the vertical sync period and the same number of horizontal sync periods that were used for the generation of the pulse gate signal in the transmitter circuitry 18. Thus, the strip pulse signal is also active at the same time the AGC pulse signal is being carried on each video signal line 80,82,84. The output transistor circuitry 136,138,140 responds to the strip pulse signal by clamping the outputs of the output amplifiers 142,144,146, respectively, to a transistor $V_{ce}$ saturation level. This output clamping process effectively strips the AGC pulse signal from each video signal line 80,82,84, such that the AGC pulse signal is not seen by the video display monitor 14 after an output BNC connection is made thereto.

Figure 4:
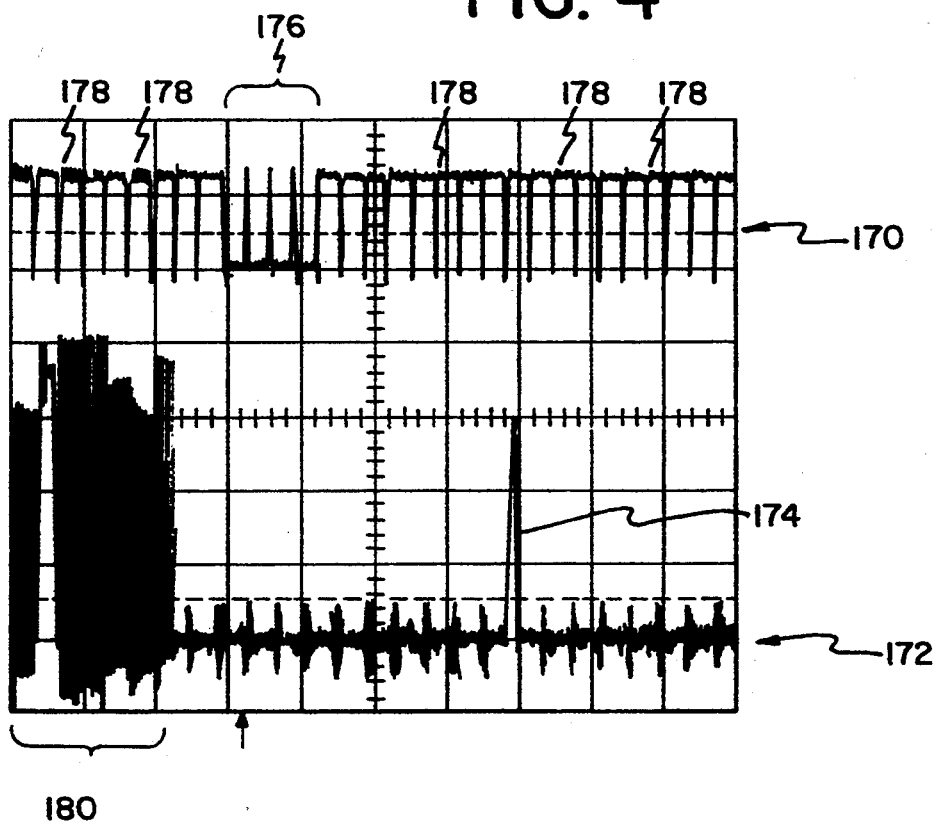
FIG. 4 shows voltage waveforms of a composite synchronization signal and a video signal having an injected automatic gain control pulse according to the present invention.
Figure 5:
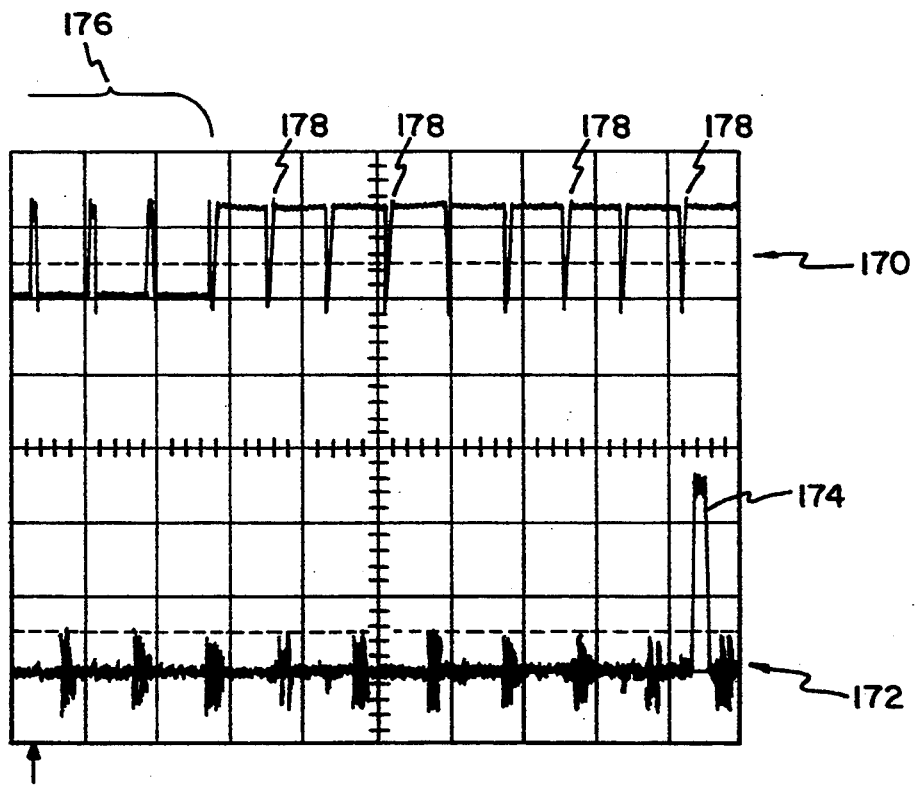
FIG. 5 shows voltage waveforms of a composite synchronization signal and a video signal having an injected automatic gain control pulse according to the present invention, these waveforms taken over a different time base than that shown in FIG. 4.

Referring to FIGS. 4 and 5, there are shown typical voltage waveforms taken over two different time bases of a composite synchronization signal 170 and a video signal 172 having an injected AGC pulse 174 according to the present invention AGC circuit 16. Referring first to FIG. 4, the composite synchronization signal 170 is shown having a vertical sync period 176 and a plurality of horizontal sync periods 178. The video signal 172 is shown having a video component 180 and the AGC pulse 174. As shown in FIGS. 4 and 5, the known amplitude of pulse 174 is less than the maximum amplitude of the video component 180 of video signal 172. Referring now to FIG. 5, the composite synchronization signal 170 is again shown for a faster timebase having the plurality of horizontal sync periods 178, but only a portion of the vertical sync period 176 is now shown. The video signal 172 is again shown having the AGC pulse 174. In this particular case it can be clearly seen from the combination of the two signals 170,172 that the AGC pulse 174 is active following the occurrence of the vertical sync period 176 and nine horizontal sync periods 178. As can best be seen by examination of FIGS. 4 and 5, the AGC pulse 174 is only generated during the vertical blanking period, and that the AGC pulse (reference pulse) occurs between sequential horizontal sync periods where a video component 180 would be inserted if said horizontal sync periods occurred after the vertical blanking period.

Figure 6:
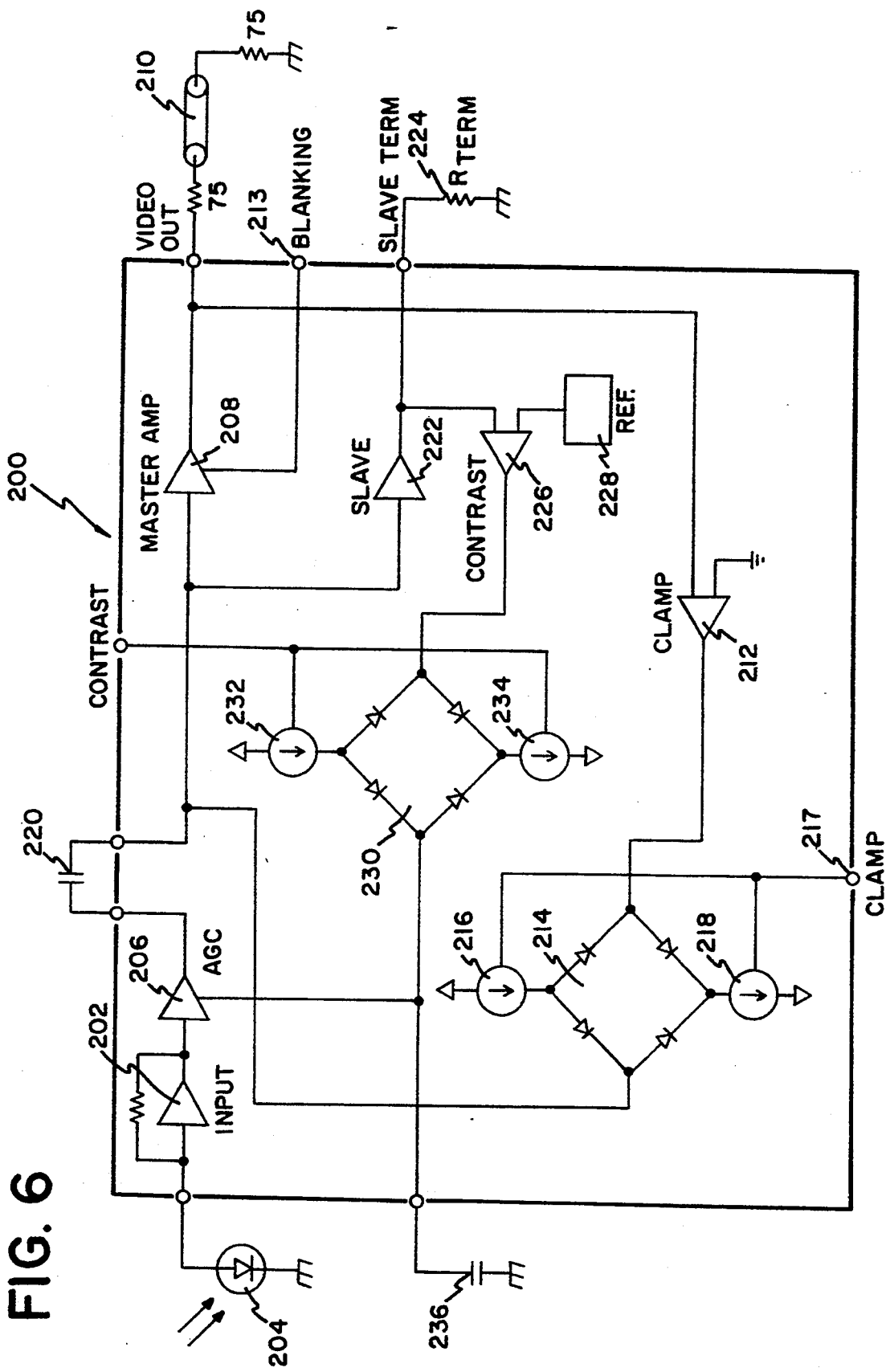
FIG. 6 is a schematic diagram of an alternative embodiment of the receiver circuitry of the automatic gain control circuit of FIG. 1 as compared to that shown in FIG. 3.

Referring to FIG. 6, there is shown alternative embodiment circuitry 200 for a single video signal channel in the receiver circuitry 20 of the AGC circuit 16. As compared to the digitally oriented circuitry shown in FIG. 3, this alternative embodiment circuitry 200 is designed using strictly analog circuitry and may be easily implemented in monolithic form. It should be noted, however, that since this alternative embodiment circuitry 200 can be used only for a single video signal channel, three sets of this circuitry 200 must be used to perform all of the functions performed by the circuitry described in FIG. 3. It should further be noted that video sync separator circuitry 110 and receiver AGC pulse timing circuitry 116 similar to that shown in FIG. 3 are required to be used with this alternative embodiment circuitry 200 so as to detect vertical and horizontal synchronization signals and generate clamp, strip pulse, and start convert signals, respectively. Lastly, it should be noted that the differences between this alternative embodiment circuitry 200 and the circuitry shown in FIG. 3 are mainly in the area of hardware, rather than in functionality.

The alternative embodiment circuitry 200 is comprised of input amplifier circuitry 202 that accepts a current mode signal from a PIN diode 204 and provides an optically induced video signal to an AGC amplifier 206. The AGC amplifier 206 is designed to have an adjustable gain that is sufficient to amplify a minimum level of the optical induced video signal to twice standard video level so as to drive a gain adjusted video signal over a series terminated cable 210. The AGC amplifier 206 is also designed to have a bandwidth greater than 200 MHz and a gain control range of at least 10 dB.

The gain adjusted video signal produced by the AGC amplifier 206 is accepted by a unity gain master amplifier 208. The master amplifier 208 is designed with a class A output capable of driving the gain adjusted video signal over the series terminated cable 210. Such a series terminated cable 210 as described here and as described above is typically a copper coaxial cable having a 75 ohm impedance. The master amplifier 208 is also designed with circuitry that is similar to the output transistor circuitry 136,138,140 described in FIG. 3, whereby in response to the strip pulse signal, which is applied to a blanking input 213, the master amplifier 208 is clamped to a transistor $V_{ce}$ saturation level. As with the output transistor circuitry 136,138,140 described in FIG. 3, this output clamping process prevents the AGC pulse signal from being seen by the video display monitor 14, which is connected to the series terminated cable 210.

The gain adjusted video signal output by the master amplifier 208 is compared to ground potential by a clamp amplifier 212. Depending upon this comparison, the clamp amplifier 212 will provide an appropriate level shift signal to a first diode bridge 214 which is driven by a first pair of complimentary current sources 216,218. The current sources 216,218 are enabled in response to the clamp signal, which is applied to a clamp input 217, and accordingly the output of the master amplifier 208 is properly restored to black level during every horizontal sync period. A coupling capacitor 220 is used as both a storage element and a compensation element for this level shifting function. The coupling capacitor 220 is typically a tantalum capacitor having a value of 1.0 uF.

A slave amplifier 222 is also provided in the alternative embodiment circuitry 200 having the same gain characteristics as the master amplifier 208. This slave amplifier 222 is series terminated by a termination resistor 224 having an impedance which duplicates that of the series terminated cable 210. Thus, the signal output from the slave amplifier 222 duplicates the signal output from the master amplifier 208, except that the slave amplifier 222 also allows the AGC pulse signal to be propagated therethrough. A contrast amplifier 226 can therefore compare the voltage level of the AGC pulse signal output from the slave amplifier 222 to the voltage level of a voltage reference 228 having a value equal to the voltage level of the AGC pulse voltage reference 50 of the transmitter circuitry 18 shown in FIG. 2. Depending upon the outcome of this comparison, the contrast amplifier 226 provides an appropriate gain signal to a second diode bridge 230 which is driven by a second pair of complimentary current sources 232,234. The current sources 232,234 are enabled in response to the start convert signal, which is applied to a contrast input 217, and accordingly the gain of the AGC amplifier 206 is properly adjusted during every vertical blanking period. As with the analog-to-digital conversion circuitry 130,132,134, the embedded processor circuitry 154,156,158, the digital-to-analog conversion circuitry 160,162,164, and the video amplifier black level clamp gain control circuitry 124,126,128 described in FIG. 3, this gain adjustment process results in the gain adjusted video signal having an voltage level equal to the voltage level that the video signal had prior to being transmitted from the transmitter circuitry 18. A bypass capacitor 236 is used as both a storage element and a compensation element for this gain adjustment function. The bypass capacitor 236 is typically a tantalum capacitor having a value of 1.0 uF.

With both of the preferred embodiments of the present invention now fully described, it can thus be seen that the primary objective set forth above is efficiently attained and, since certain changes may be made in the above-described embodiments without departing from the scope of the invention, it is intended that all matter contained in the above description or shown in the accompanying drawings shall be interpreted as illustrative and not in a limiting sense.

What is claimed is:

1. An automatic gain control circuit for a video transmission system for transmitting video signals (172) containing horizontal and vertical synchronization pulses and a video component (180) from a video source at a first location to a second location comprising:

A) transmitter circuitry having an output and having means for receiving electrical signals from the video source, means for translating said electrical signals into optical video signals at the output, means for determining the vertical synchronization and horizontal synchronization pulses of the video source so as to generate and inject a reference pulse of a known amplitude less than the maximum amplitude of the video component, said reference pulse generated and injected after a predetermined number of horizontal synchronization pulses have occurred during the vertical blanking period of the video signals and specifically during the period of time between sequential horizontal synchronization pulses where the video component (180) of the video signals (172) would normally be inserted if the horizontal pulses occurred after the vertical blanking period;

B) receiver circuitry having an input and output, and having means for receiving the optical video signals at the input and for translating these signals into output video electrical signals at a given gain at the output, said electrical signals corresponding video signals containing horizontal and vertical synchronization pulses and the video component of the video signals, said receiver circuitry including means for detecting vertical synchronization and horizontal synchronization pulses, and further having means for extracting the transmitted reference pulse during the vertical blanking period and specifically after said predetermined number of horizontal synchronization pulses have been detected during the vertical blanking period and during the period of time between sequential horizontal synchronization pulses where the video component would normally be present if the horizontal pulses occurred after the vertical blanking period, means for comparing the extracted reference pulse to a stored reference voltage, and means, responsive to the comparison means, for increasing or decreasing the gain of said receiver circuitry so that the output video electrical signals correspond in amplitude to the video electrical signals from the video source to which the transmitter circuitry receives its associated video signals; and C) a fiber-optic link connected between the output of the transmitter circuitry and the input of the receiver circuitry for carrying said optical video signals from the transmitter circuitry to the receiver circuitry.

2. An automatic gain control circuit for a video transmission system for transmitting video signals (172) containing horizontal and vertical synchronization pulses and a video component (180) from a video source at a first location to a second location comprising:

A) transmitter circuitry having an output and having means for receiving electrical signals from the video source, means for translating said electrical signals into optical video signals at the output, means for determining the vertical synchronization and horizontal synchronization pulses of the video source so as to generate and inject a reference pulse of a known amplitude less than the maximum amplitude of the video component, said reference pulse generated and injected after a predetermined number of horizontal synchronization pulses have occurred during the vertical blanking period of the video signals and specifically during the period of time between sequential horizontal synchronization pulses where the video component (180) of the video signals (172) would normally be inserted if the horizontal pulses occurred after the vertical blanking period;

B) receiver circuitry having an input and output, and having means for receiving the optical video signals at the input and for translating these signals into output video electrical signals at a given gain at the output, said electrical signals corresponding video signals containing horizontal and vertical synchronization pulses and the video component of the video signals, said receiver circuitry including means for detecting vertical synchronization and horizontal synchronization pulses, and further having means for extracting the transmitted reference pulse during the vertical blanking period and specifically after said predetermined number of horizontal synchronization pulses have been detected during the vertical blanking period and during the period of time between sequential horizontal synchronization pulses where the video component would normally be present if the horizontal pulses occurred after the vertical blanking period, means for digitizing the amplitude of the extracted reference pulse, means for comparing the digitized extracted reference pulse to the digitized amplitude of a stored reference voltage, and means, responsive to the comparison means, for increasing or decreasing the gain of said receiver circuitry so that the output video electrical signals correspond in amplitude to the video electrical signals from the video source to which the transmitter circuitry receives its associated video signals; and C) a fiber-optic link connected between the output of the transmitter circuitry and the input of the receiver circuitry for carrying said optical video signals from the transmitter circuitry to the receiver circuitry.

3. An automatic gain control circuit for a video transmission system for transmitting video signals (172) containing horizontal and vertical synchronization pulses and a video component (180) from a video source at a first location to a second location comprising:

A) transmitter circuitry having an output and having means for receiving electrical signals from the video source, means for translating said electrical signals into optical video signals at the output, means for determining the vertical synchronization and horizontal synchronization pulses of the video source so as to generate and inject a reference pulse of a known amplitude less than the maximum amplitude of the video component, said reference pulse generated and injected after a predetermined number of horizontal synchronization pulses have occurred during the vertical blanking period of the video signals and specifically during the period of time between sequential horizontal synchronization pulses where the video component (180) of the video signals (172) would normally be inserted if the horizontal pulses occurred after the vertical blanking period;

B) receiver circuitry having an input and output, and having means for receiving the optical video signals at the input and for translating these signals into output video electrical signals at a given gain at the output, said electrical signals corresponding video Signals containing horizontal and vertical synchronization pulses and the video component of the video signals, said receiver circuitry including means for detecting vertical synchronization and horizontal synchronization pulses, and further having means for extracting the transmitted reference pulse during the vertical blanking period and specifically after said predetermined number of horizontal synchronization pulses have been detected during the vertical blanking period and during the period of time between sequential horizontal synchronization pulses where the video component would normally be present if the horizontal pulses occurred after the vertical blanking period, means for generating an analog amplitude value of the extracted reference pulse, means for comparing the analog extracted reference pulse to the analog amplitude of a stored reference voltage, and means, responsive to the comparison means, for increasing or decreasing the gain of said receiver circuitry so that the output video electrical signals correspond in amplitude to the video electrical signals from the video source to which the transmitter circuitry receives its associated video signals; and C) a fiber-optic link connected between the output of the transmitter circuitry and the input of the receiver circuitry for carrying said optical video signals from the transmitter circuitry to the receiver circuitry.

4. The automatic gain control circuit as defined in claim 1, wherein said receiver circuitry further comprises means for stripping said reference pulse from said output video electrical signals during said comparative detection.

5. The automatic gain control circuit as defined in claim 4, wherein said receiver circuitry further comprises means for restoring said output video electrical signals to a black level during a horizontal synchronization period.

6. The automatic gain control circuit as defined in claim 4, wherein said transmitter circuitry further comprises means for injecting an offset amplitude level into said optical signal along with said reference pulse.

7. The automatic gain control circuit as defined in claim 6, wherein said receiver circuitry further comprises means for restoring said video electrical signals to said offset amplitude level during a horizontal synchronization period.

8. The automatic gain control circuit as defined in claim 1, wherein said video signals are comprised of red, green and blue video signals and a separate composite synchronization signal.

9. The automatic gain control circuit as defined in claim 1, wherein said video signals are comprised of red, green and blue video signals and a synchronization signal superimposed on said green video signal.

10. The automatic gain control circuit as defined in claim 1, wherein said video format are comprised of a monochromatic video signal and a separate composite synchronization signal.

11. The automatic gain control circuit as defined in claim 1, wherein said standard video format electrical signals are comprised of a monochromatic video signal with a synchronization signal imposed on the monochromatic video signal.

12. The automatic gain control circuit as defined in claim 2, wherein said gain adjustment comparison is performed by a digital controller, and wherein said digital controller converts the amplitude level of said reference pulse in said output video electrical signals into said reference digitized value.

13. The automatic gain control circuit as defined in claim 12, wherein said reference digitized value is stored in said digital controller.

14. The automatic gain control circuit as defined in claim 2, further wherein said receiver circuitry comprises means for stripping said reference pulse from said output video electrical signals during said gain adjustment comparison.

15. The automatic gain control circuit as defined in claim 14, further wherein said receiver circuitry comprises means for restoring said output video electrical signals to a black level during a horizontal synchronization period.

16. The automatic gain control circuit as defined in claim 14, further wherein said transmitter circuitry comprises means for injecting an offset amplitude level into said optical signal along with said reference pulse.

17. The automatic gain control circuit as defined in claim 16, further wherein said receiver circuitry comprises means for restoring said output video electrical signals to said offset amplitude level during a horizontal synchronization period.

18. The automatic gain control circuit as defined in claim 3, wherein said gain adjustment comparison is performed by an analog contrast amplifier.

19. The automatic gain control circuit as defined in claim 2, wherein said video signals are comprised of red, green and blue video signals and a separate composite synchronization signal.

20. The automatic gain control circuit as defined in claim 2, wherein said video signals are comprised of red, green and blue video signals and a synchronization signal superimposed on said green video signal.

21. The automatic gain control circuit as defined in claim 2, wherein said video signals are comprised of a monochromatic video signal and a separate composite synchronization signal.

22. The automatic gain control circuit as defined in claim 2, wherein said video signals are comprised of a monochromatic video signal with a synchronization signal imposed on the monochromatic video signal.

23. The automatic gain control circuit as defined in claim 3, wherein said reference analog amplitude value is provided by an analog voltage reference.

24. The automatic gain control circuit as defined in claim 3, further wherein said receiver circuitry comprises means for stripping said reference pulse from said output video electrical signals during said gain adjustment comparison.

25. The automatic gain control circuit as defined in claim 24, further wherein said receiver circuitry comprises means for restoring said output video electrical signals to a black level during a horizontal synchronization period.

26. The automatic gain control circuit as defined in claim 24, further wherein said transmitter circuitry comprises means for injecting an offset amplitude level into said optical video signals along with said reference pulse.

27. The automatic gain control circuit as defined in claim 26, further wherein said receiver circuitry comprises means for restoring said output video electrical signals to said offset amplitude level during a horizontal synchronization period.

28. The automatic gain control circuit as defined in claim 3, wherein said video format electrical signals are comprised of red, green and blue video signals and a separate composite synchronization signal.

29. The automatic gain control circuit as defined in claim 3, wherein said video signals are comprised of red, green and blue video signals and a synchronization signal superimposed on said green video signal.

30. The automatic gain control circuit as defined in claim 3, wherein said video signals are comprised of a monochromatic video signal and a separate composite synchronization signal.

31. The automatic gain control circuit as defined in claim 3, wherein said video signals are comprised of a monochromatic video signal with a synchronization signal imposed on the monochromatic video signal.

* * * * *

UNITED STATES PATENT AND TRADEMARK OFFICE
CERTIFICATE OF CORRECTION

Figure 3A:
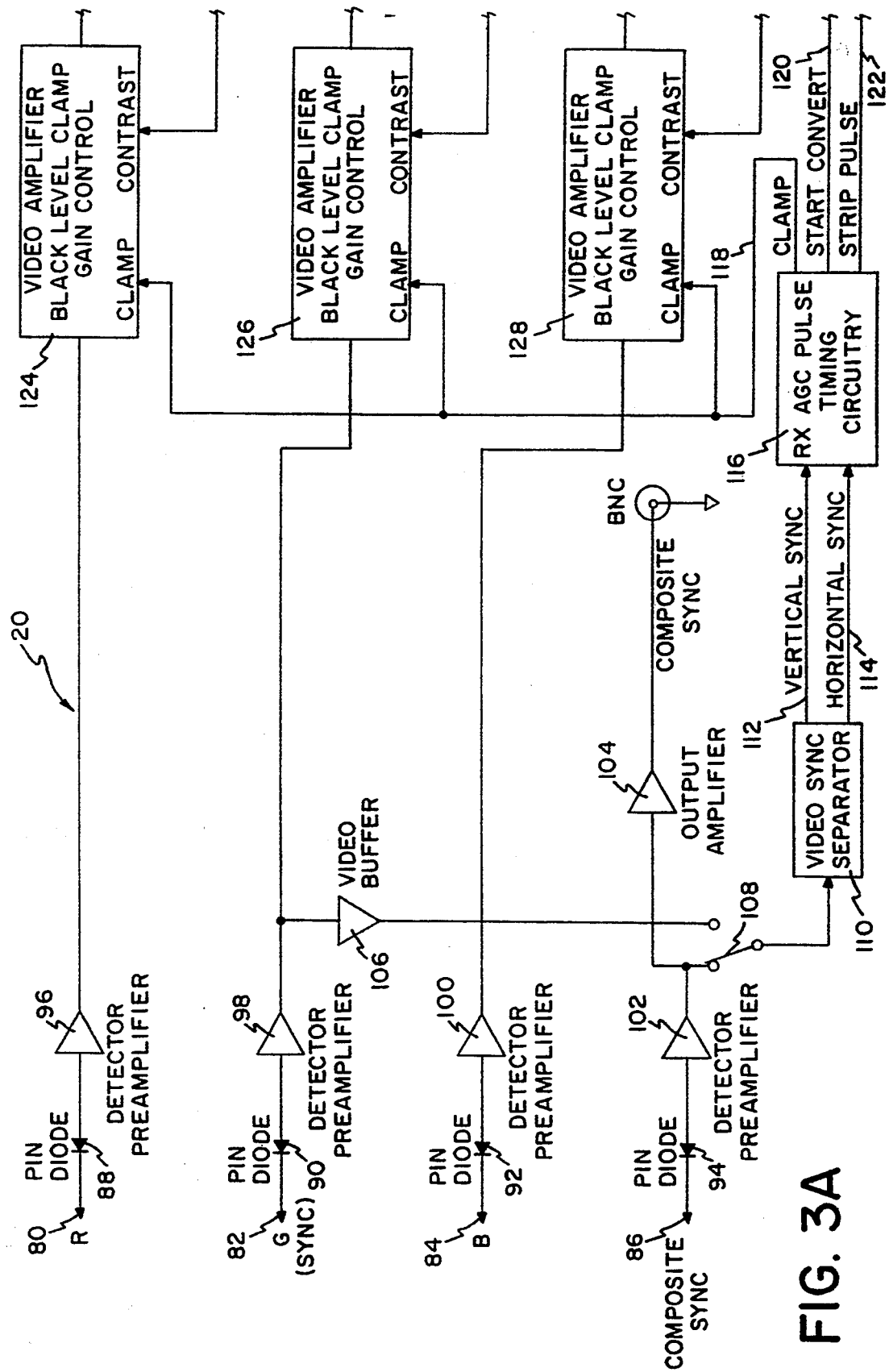
FIG. 3 is a schematic diagram of the receiver circuitry of the automatic gain control circuit of FIG. 1.

PATENT NO.   : 5,410,363
DATED        : April 25, 1995
INVENTOR(S)  : Capen et al It is certified that error appears in the above-indentified patent and that said Letters Patent is hereby corrected as shown below:

At column 3, line 50, please insert a comma after "FIG. 2"; and at line 53, after "FIG. 3", please insert --, consisting of FIGS. 3A and 3B--.

At column 7, lines 59 and 68, please change "21.0 to --210-- in each instance.

At column 11, line 10, please change "Signals" to --signals--.

At column 12, line 4, please delete "standard" and "format electrical".

Signed and Sealed this

Fourteenth Day of November, 1995

Attest:

BRUCE LEHMAN

Attesting Officer

Commissioner of Patents and Trademarks